United States Patent

Badehi

[11] Patent Number: 5,980,663
[45] Date of Patent: Nov. 9, 1999

[54] BONDING MACHINE

[75] Inventor: Pierre Badehi, Yahuda, Israel

[73] Assignee: Shellcase Ltd., Jerusalem, Israel

[21] Appl. No.: 08/952,019

[22] PCT Filed: Apr. 25, 1996

[86] PCT No.: PCT/EP96/01747

§ 371 Date: Feb. 27, 1998

§ 102(e) Date: Feb. 27, 1998

[87] PCT Pub. No.: WO96/36675

PCT Pub. Date: Nov. 21, 1996

[30] Foreign Application Priority Data

May 15, 1995 [IL] Israel ........................................ 113739

[51] Int. Cl.⁶ .................................................. B29C 65/52
[52] U.S. Cl. ........................... 156/64; 156/358; 156/359; 156/583.1
[58] Field of Search .................................. 156/73.5, 499, 156/580, 583.1, 64, 358, 359

[56] References Cited

U.S. PATENT DOCUMENTS 4,636,124  1/1987  Gugle et al. ............................... 411/82
4,795,524  1/1989  Sakaida et al. ........................... 156/498

FOREIGN PATENT DOCUMENTS

| 0243517 | 11/1987 | European Pat. Off. . |
| 2352707 | 4/1975 | Germany . |
| 4041199 | 7/1992 | Germany . |
| 60-097820 | 5/1985 | Japan . |
| 61-251543 | 11/1986 | Japan . |
| 8502514 | 4/1987 | Netherlands . |
| 1460461 | 1/1977 | United Kingdom . |

*Primary Examiner*—James Sells
*Attorney, Agent, or Firm*—Banner & Witcoff Ltd.

[57] ABSTRACT

This invention discloses a method of bonding a lower substrate with an upper substrate comprising applying an adhesive (56) on at least one of the lower (12) and the upper (14) substrates, and rotating the lower and the upper substrates thereby to create a centrifugal force which causes the adhesive to spread between the lower and the upper substrates with a substantially uniform thickness, while applying a pressure upon the upper substrate thereby to bond the lower and upper substrates. The invention also discloses an apparatus for bonding the lower substrate with the upper substrate.

7 Claims, 5 Drawing Sheets

BONDING MACHINE

The present invention relates to apparatus and methods for bonding generally.

Many adhesives used to bond materials require application of pressure and/or heat to achieve a successful bond. Bonding relatively delicate materials, or substrates which include sensitive components, such as in the field of microelectronics, demands special care in the proper application of heat and pressure. Excessive heat or pressure may damage sensitive components.

In addition, maintaining a uniformly thin layer of adhesive between the bonded materials is often critical for proper functioning of the finished part.

The present invention seeks to provide apparatus and a method for application of a uniformly thin layer of adhesive between materials wherein significantly less pressure and heat is required to achieve the same bond than for techniques known in the art.

There is thus provided in accordance with a preferred embodiment of the present invention a method of bonding a lower substrate with an upper substrate including applying an adhesive on at least one of the lower and the upper substrates, and rotating the lower and the upper substrates thereby to create a centrifugal force which causes the adhesive to spread between the lower and the upper substrates with a substantially uniform thickness, while applying a pressure upon the upper substrate thereby to bond the lower and the upper substrates.

In accordance with a preferred embodiment of the present invention, the method additionally includes heating at least one of the lower and the upper substrates.

Further in accordance with a preferred embodiment of the present invention, the method includes controlling the temperature of at least one of the lower and the upper substrates.

Further in accordance with a preferred embodiment of the present invention, the method includes controlling the pressure applied upon the upper substrate.

There is also provided in accordance with a preferred embodiment of the present invention a bonding machine including a lower chuck adapted to fixedly receive a lower substrate, an upper chuck rotatably engageable with the lower chuck and operative to apply a pressure upon the upper substrate when positioned upon the lower substrate, a rotator operative to rotate the lower chuck, thereby to create a centrifugal force which causes an adhesive applied on at least one of the lower and the upper substrates to spread therebetween with a substantially uniform thickness, and wherein application of the pressure by the upper chuck upon the upper substrate causes bonding of the lower and the upper substrates.

Additionally in accordance with a preferred embodiment of the present invention, at least one of the lower and the upper chucks includes a heater.

Further in accordance with a preferred embodiment of the present invention, at least one of the lower and the upper chucks includes a temperature sensor which communicates with a controller for temperature control of at least one of the lower and the upper chucks.

Still further in accordance with a preferred embodiment of the present invention, the lower chuck includes at least one engagement element and the upper chuck includes at least one engagement arm for selectable engagement with the at least one engagement element.

Additionally in accordance with a preferred embodiment of the present invention, there is provided an orientation sensor operative to sense the position of the at least one engagement arm and to signal the rotator to rotate the lower chuck such that the at least one engagement element is oriented to be in engageable orientation with respect to the at least one engagement arm.

In accordance with a preferred embodiment of the present invention, the rotator is a variable speed servomotor.

Further in accordance with a preferred embodiment of the present invention, there is provided a motion device for selectably moving the upper chuck generally vertically with respect to the lower chuck.

Still further in accordance with a preferred embodiment of the present invention, there is provided a pressure controller for controlling the pressure applied by the upper chuck.

The present invention will be understood and appreciated more fully from the following detailed description, taken in conjunction with the drawing in which.

Figure 1:
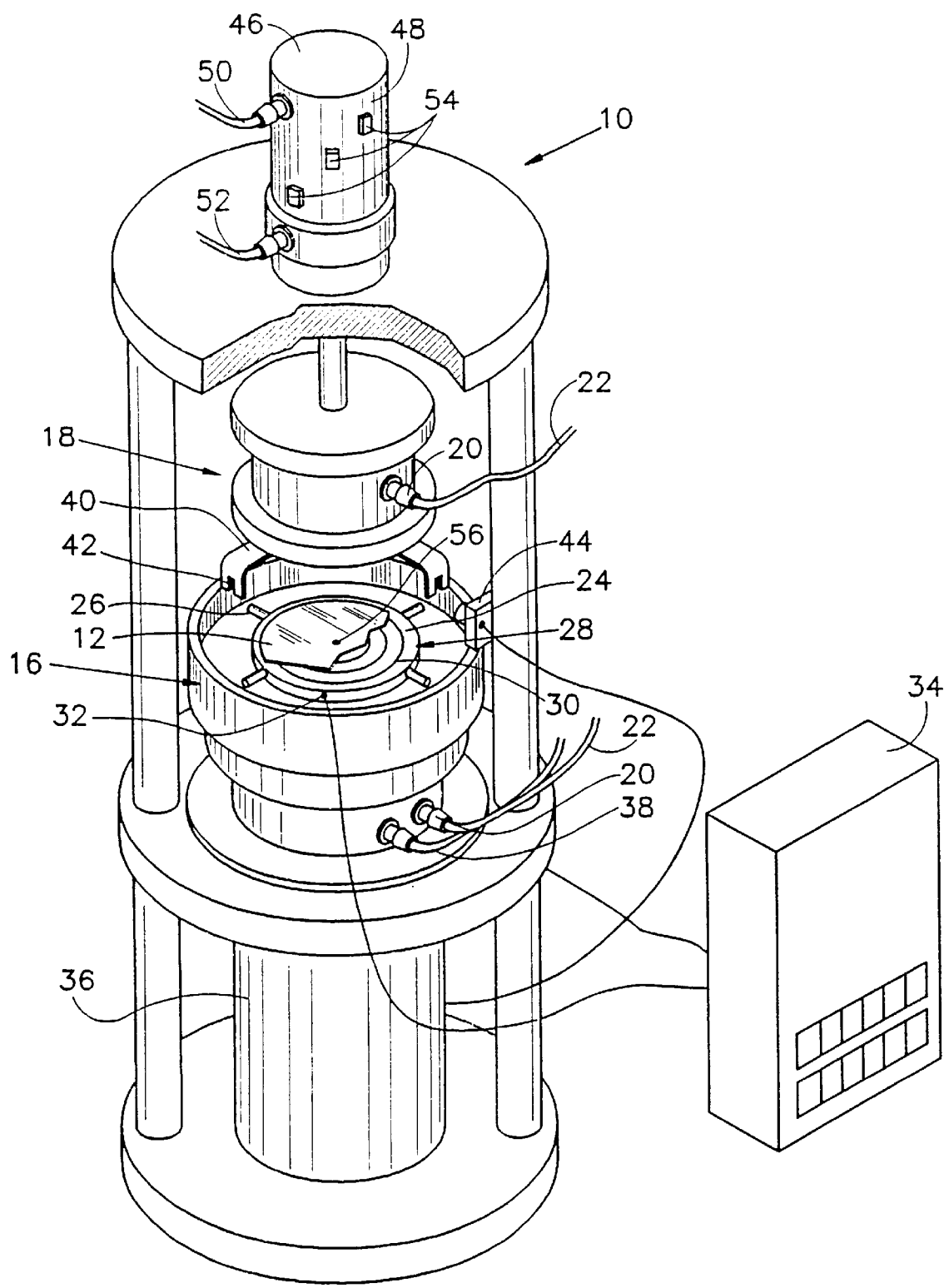
FIG. 1 is a simplified pictorial illustration of a bonding machine constructed and operative in accordance with a preferred embodiment of the present invention, with an upper chuck positioned above a lower chuck.
Figure 2:
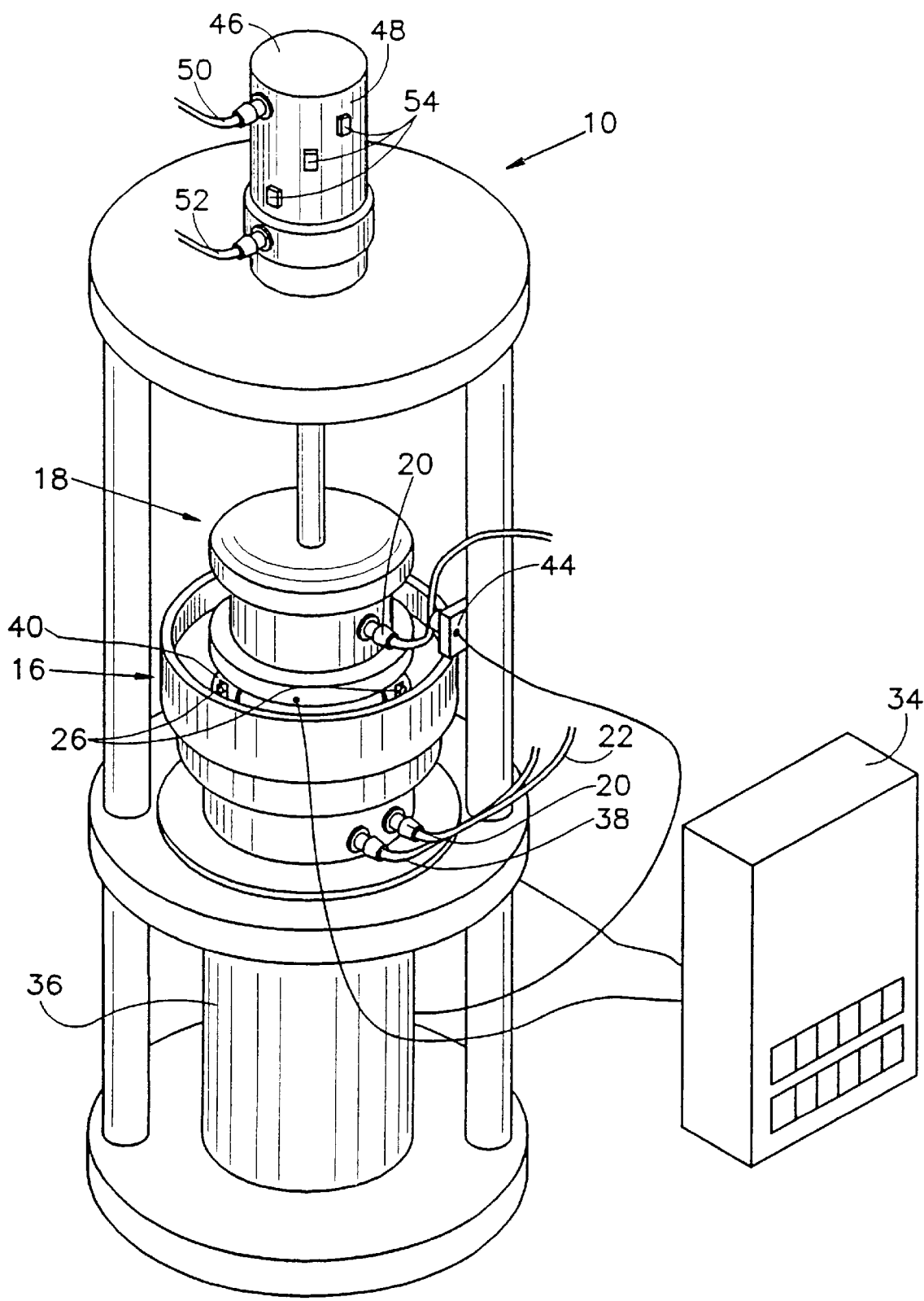
FIG. 2 is a simplified pictorial illustration of the bonding machine of FIG. 1 with the upper chuck applying pressure to achieve bonding of substrates.
Figure 3:
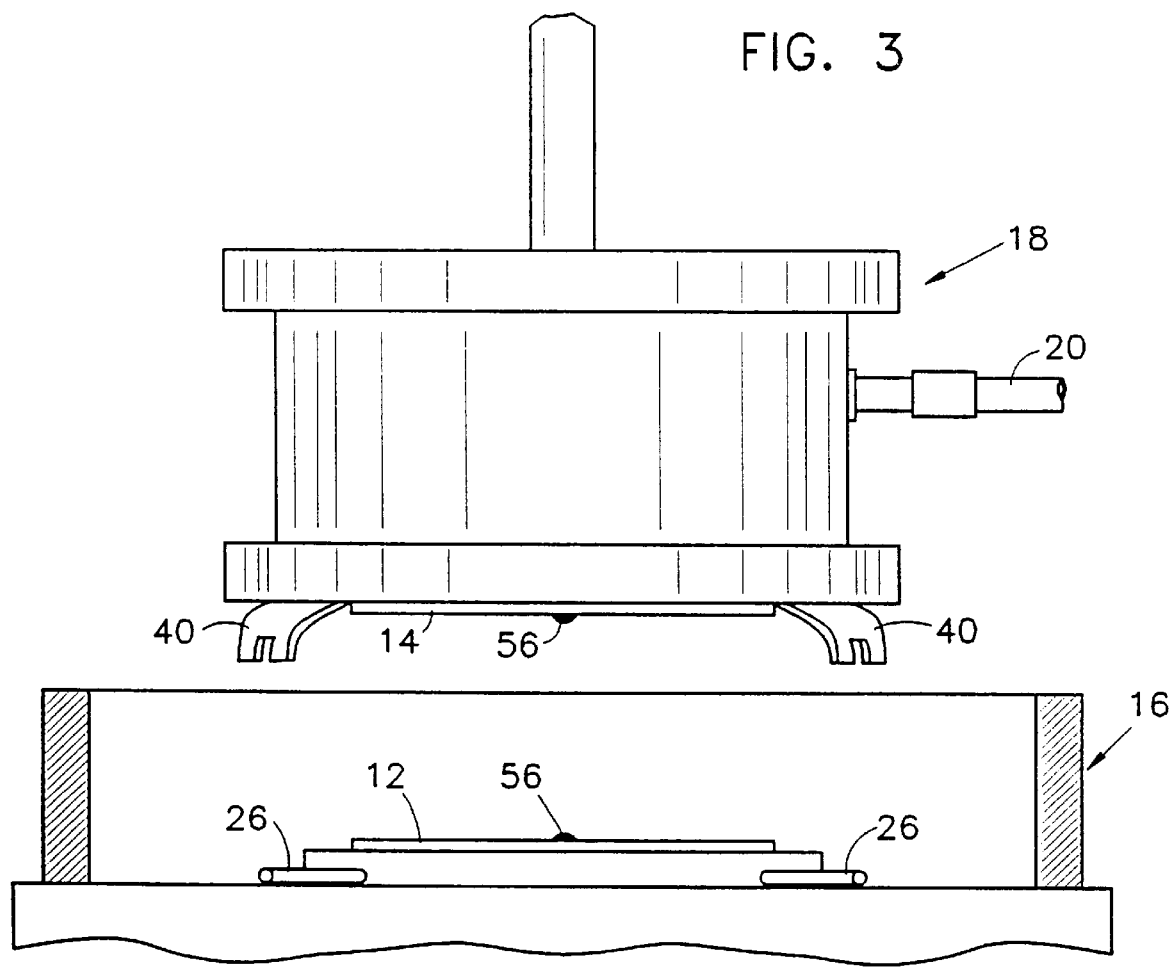
FIGS. 3 and 4 are partial, simplified side view illustrations of the bonding machine, corresponding respectively to FIGS. 1 and 2.
Figure 4:
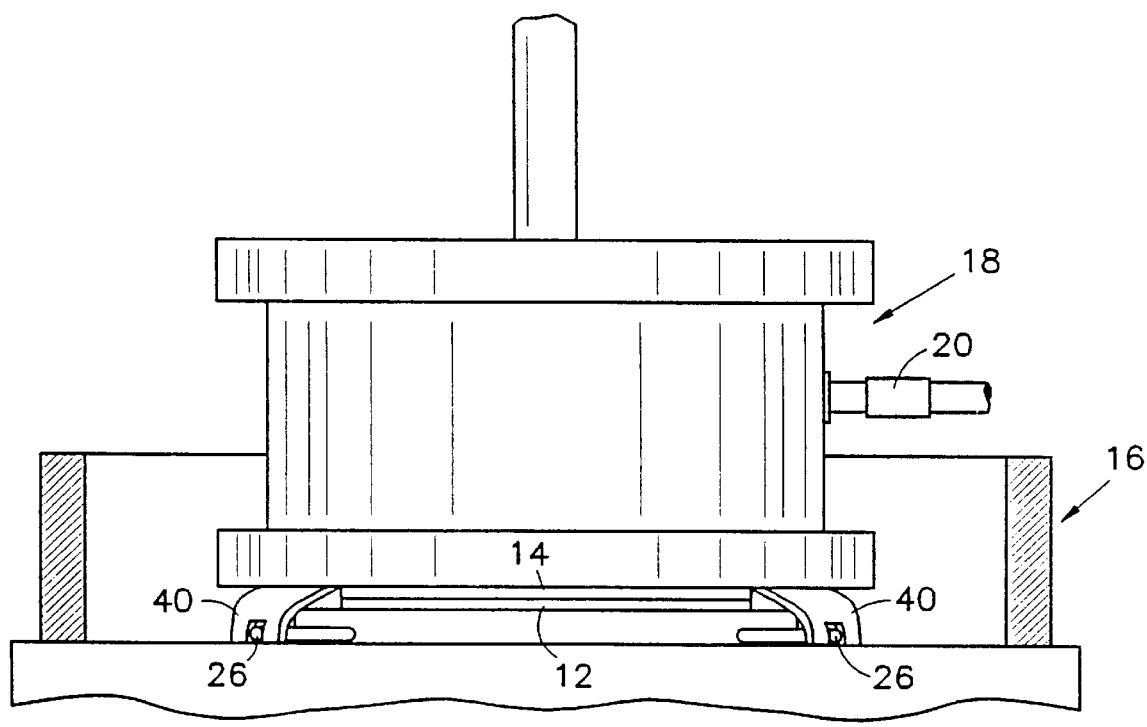

Reference is now made to FIGS. 1–4 which illustrate a bonding machine 10 constructed and operative in accordance with a preferred embodiment of the present invention. Bonding machine 10 is useful for bonding a lower substrate 12 with an upper substrate 14. (Upper substrate 14 is seen in FIGS. 3 and 4.) The substrates 12 and 14 may be of any material suitable for bonding. Bonding machine 10 is particularly suitable for bonding relatively delicate substrates which include sensitive components, such as in the field of microelectronics In accordance with a preferred embodiment of the present invention, bonding machine 10 includes a lower chuck 16 and an upper chuck 18. Lower chuck 16 is adapted to fixedly receive the lower substrate 12 and upper chuck 18 is adapted to fixedly receive the upper substrate 14, preferably each with a vacuum supplied via vacuum connectors 20 and vacuum hoses 22, such as those typically used in machine tools as is known in the art.

Lower chuck 16 includes a generally flat bed 24 and at least one engagement element 26 which preferably radially protrudes from the flat bed 24. In the illustrated embodiment there are four engagement elements 26.

In accordance with a preferred embodiment of the present invention, lower chuck 16 is provided with a heater 28, preferably in the form of generally concentric, circular electric heating elements 30. Further in accordance with a preferred embodiment of the present invention, one or more temperature sensors 32, such as thermocouples or thermistors, are located in lower chuck 16, preferably embedded in flat bed 24. Temperature sensors 32 and heater 28 are connected to a temperature controller 34 for controlled heating of lower chuck 16 and lower substrate 12.

A rotator 36 is provided for rotating flat bed 24 of lower chuck 16. In accordance with a preferred embodiment of the present invention, rotator 36 is a variable speed servomotor, which allows for controlled rotation at varying, including optimum, speeds. Rotator 36 may be cooled by a fluid, such as air, via a cooling conduit 38.

Upper chuck 18 includes at least one engagement arm 40 for selectable engagement with engagement elements 26. In the illustrated embodiment, there are four engagement arms 40, one for each engagement element 26. Each engagement arm 40 preferably has a groove 42 sized such that when upper chuck 18 is lowered onto lower chuck 16, grooves 42 mate with engagement elements 26 when appropriately aligned therewith.

In a preferred embodiment of the present invention, engagement arms 40 are aligned with engagement elements 26 by means of an orientation sensor 44 which senses the position of the engagement arms 40. Orientation sensor 44 may be a proximity switch, such as proximity switch TL-X2C1-GE manufactured by Omron, Inc., U.S.A. In operation of bonding machine 10, one of the engagement arms 40 is manually aligned with orientation sensor 44. Orientation sensor 44 senses the presence of the engagement arm 40 and signals rotator 36 to rotate flat bed 24 of lower chuck 16 such that the engagement elements 26 are brought into engageable orientation with respect to the engagement arms 40.

In accordance with a preferred embodiment of the present invention, there is provided a motion device 46 for selectably moving upper chuck 18 generally vertically with respect to lower chuck 16. In the illustrated embodiment, motion device 46 includes a movable, pneumatic piston 48 actuated by pressurized air supplied through a conduit 50. Piston 48 is also operative to press substrate 14 downwards upon substrate 12. Piston 48 is preferably cooled by a fluid, such as air, via a cooling conduit 52.

Position sensors 54 may be provided along motion device 46 for accurate, controlled movement of upper chuck 18, as well as for controlling the pressure applied by upper chuck 18.

It is appreciated that upper chuck 18 may comprise a heater and temperature sensors in addition to, or instead of, heater 28 and temperature sensors 32 of lower chuck 16.

The operation of bonding machine 10 is now described. Lower substrate 12 is placed upon lower chuck 16 and fixedly held thereon with a vacuum. Upper substrate 14 is placed on the underside of upper chuck 18 and fixedly held thereon with a vacuum. An adhesive 56 is applied upon an upper surface of lower substrate 12. Adhesive 56 may be any kind of adhesive, usually an epoxy. For two part epoxies, one part may be applied on lower substrate 12 and the other part on upper substrate 14, as shown in FIG. 3. For microelectronics, the viscosity of the adhesive is preferably limited to a range of 400 to 2000 centipoise. A greater viscosity tends to produce non-uniform adhesion between the substrates. A lower viscosity tends to produce undesirable air bubbles between the substrates.

Typically, for microelectronic substrates, one drop of a first part epoxy, approximately 0.1 ml, is applied on lower substrate 12 and one drop of the second part of the epoxy, also about 0.1 ml, is applied on upper substrate 14.

One of the engagement arms 40 is then aligned, typically manually, with orientation sensor 44 which signals rotator 36 to rotate flat bed 24 of lower chuck 16, thereby aligning engagement elements 26 with engagement arms 40. Piston 48 is then used to carefully lower upper chuck 18 with upper substrate 14 upon lower substrate 12.

Once upper chuck 18 is properly positioned upon lower chuck 16, piston 48 is used to apply pressure upon the substrates 14 and 12. Typically, for microelectronics, the pressure is approximately 500 Pa. Heater 28, in conjunction with temperature sensors 32 and controller 34, is used to heat the substrates to a desired temperature, typically approximately 65 degrees Celsius for microelectronics. As mentioned hereinabove, a heater may be additionally used to heat the substrates from upper chuck 18.

Rotator 36 is used to rotate the lower 16 and upper chucks 18. The chucks rotate together because the engagement elements 26 are engaged with engagement arms 40. Typically, for microelectronics, the rotation speed is approximately 1500 RPM and the duration of rotation is about 2 minutes.

Figure 5:
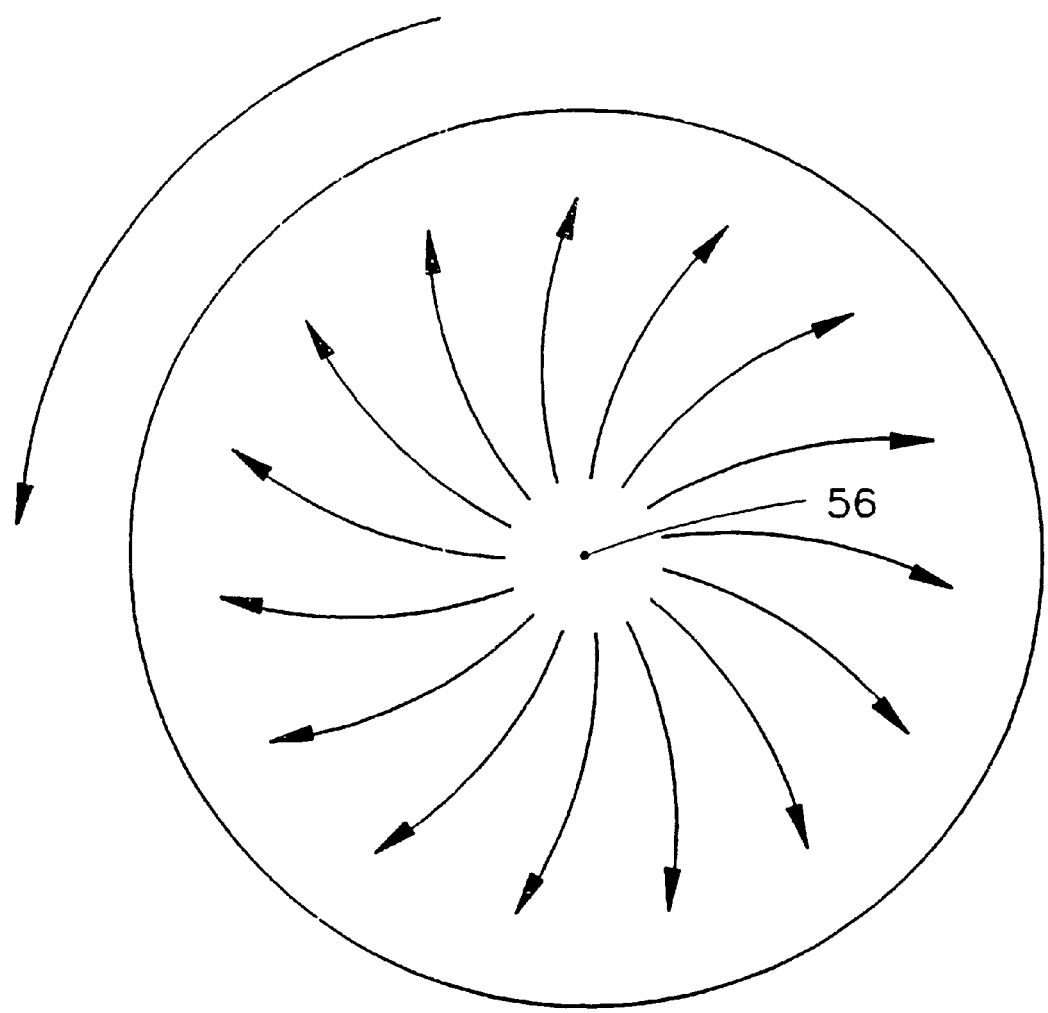
FIG. 5 is a simplified top view showing a spreading pattern of an adhesive applied between the substrates being bonded, which pattern being caused by the rotation of the chucks.

Reference is now made to FIG. 5 which illustrates a typical spreading pattern of the adhesive 56 as the chucks rotate. The rotation of the chucks creates a centrifugal force which causes adhesive 56 to spread between the substrates 12 and 14 with a substantially uniform thickness. Typically, for microelectronics, bonding machine 10 produces a bond with a substantially uniform thickness of approximately 10 microns.

It will be appreciated by persons skilled in the art that the present invention is not limited by what has been particularly shown and described hereinabove. Rather the scope of the present invention is defined only by the claims which follow:

I claim:

1. A method of bonding a lower substrate with an upper substrate comprising the steps of:

applying an adhesive on at least one of said lower and said upper substrates;

placing said upper substrate upon said lower substrate, with said adhesive therebetween;

heating at least one of said lower and said upper substrates;

controlling the temperature of at least one of said lower and said upper substrates; and rotating said lower and said upper substrates thereby to create a centrifugal force which causes said adhesive to spread between said lower and said upper substrates with a substantially uniform thickness, while applying a pressure upon said upper substrate thereby to bond said lower and said upper substrates.

2. A method according to claim 1 further comprising the step of controlling application of said pressure.

3. A bonding machine comprising:

a lower chuck adapted to fixedly receive a lower substrate;

an upper chuck rotatably engageable with said lower chuck and operative to apply a pressure upon an upper substrate when positioned upon said lower substrate; and a rotator operative to rotate said lower chuck, thereby to create a centrifugal force which causes an adhesive applied on at least one of said lower and said upper substrates to spread therebetween with a substantially uniform thickness, wherein application of said pressure by said upper chuck upon said upper substrate causes bonding of said lower and said upper substrates;

wherein at least one of said lower and said upper chucks comprises a heater, and wherein at least one of said lower and said upper chucks comprises a temperature sensor which communicates with a controller for controlling the temperature of at least one of said lower and said upper chucks.

4. A bonding machine according to claim 3 wherein said lower chuck comprises at least one engagement element and said upper chuck comprises at least one engagement arm for selectable engagement with said at least one engagement element.

5. A bonding machine according to claim 4 further comprising an orientation sensor operative to sense a position of said at least one engagement arm and to signal said rotator to rotate said lower chuck to a position such that said at least one engagement element is aligned with said at least one engagement arm so that said at least one engagement element and said at least one engagement arm may engage one another.

6. A bonding machine according to claim 3 wherein said rotator is a variable speed servomotor.

7. A bonding machine according to claim 3 further comprising a motion device for selectably moving said upper chuck generally vertically with respect to said lower chuck.

* * * * *